Oct. 22, 1940.    G. B. HILL ET AL    2,218,577
SWEEP RAKE
Filed May 29, 1939    4 Sheets-Sheet 1

INVENTORS
GEORGE B. HILL
FRANK D. JONES
BY
ATTORNEYS.

Oct. 22, 1940.  G. B. HILL ET AL  2,218,577
SWEEP RAKE
Filed May 29, 1939   4 Sheets-Sheet 2
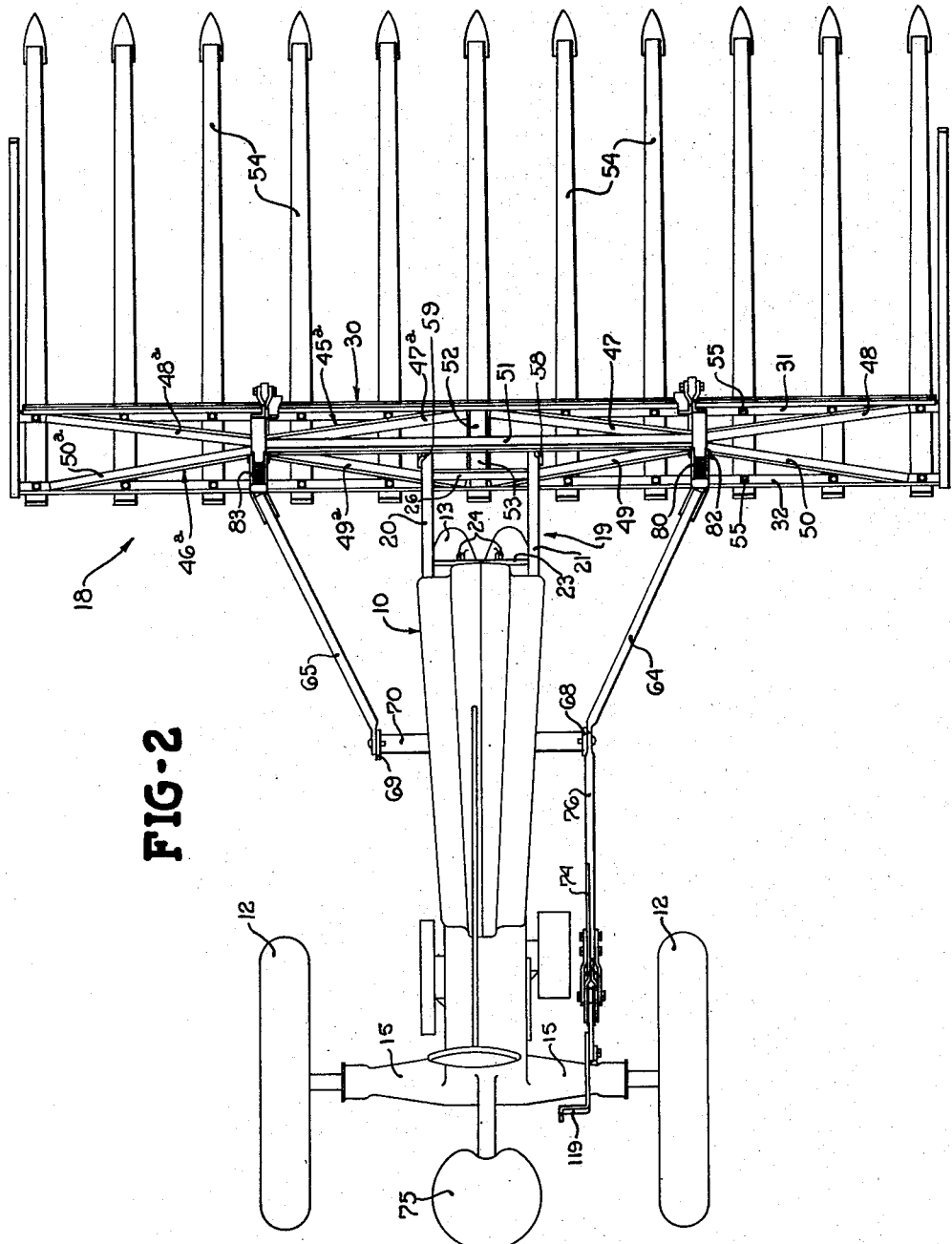
INVENTORS
GEORGE B. HILL
FRANK D. JONES
BY
ATTORNEYS.

Oct. 22, 1940.   G. B. HILL ET AL   2,218,577
SWEEP RAKE
Filed May 29, 1939   4 Sheets-Sheet 3
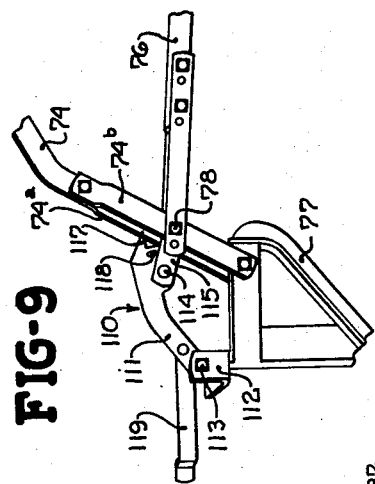
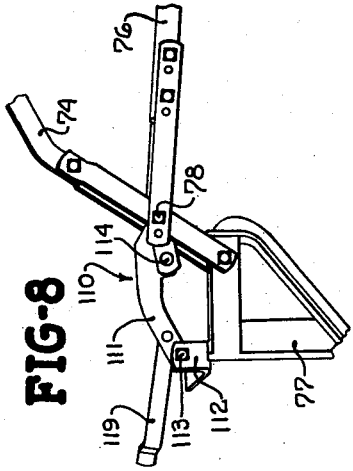
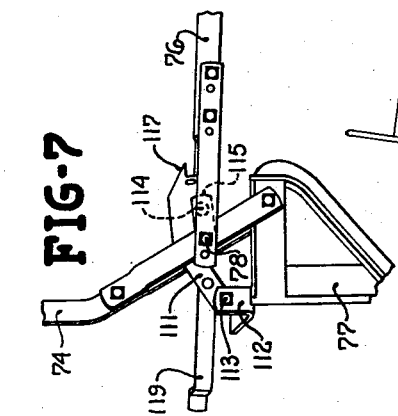
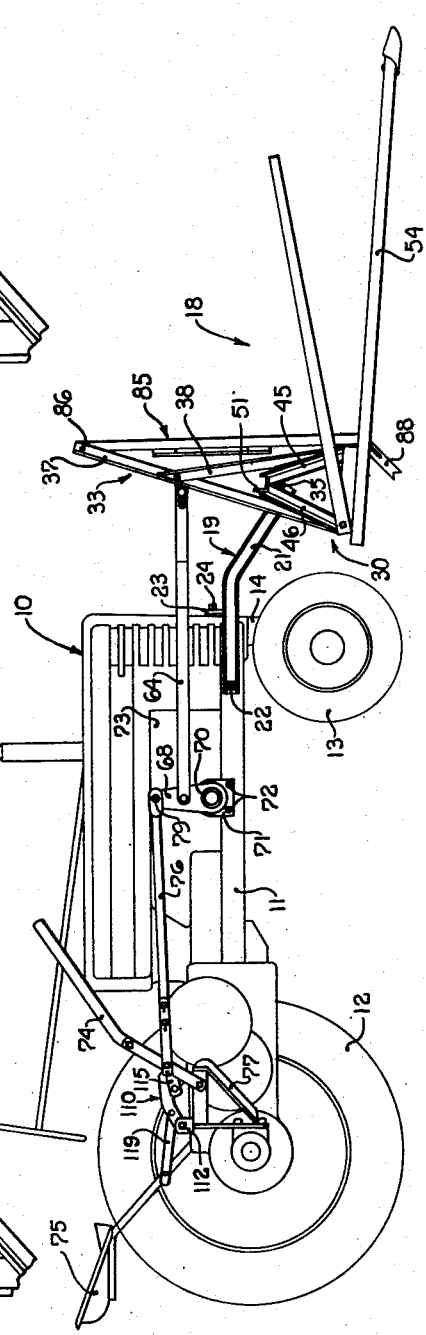
INVENTORS
GEORGE B. HILL
FRANK D. JONES
BY
ATTORNEYS.

Oct. 22, 1940.   G. B. HILL ET AL   2,218,577
SWEEP RAKE
Filed May 29, 1939   4 Sheets-Sheet 4

INVENTORS
GEORGE B. HILL
FRANK D. JONES
BY
ATTORNEYS.

Patented Oct. 22, 1940

2,218,577

UNITED STATES PATENT OFFICE 2,218,577

SWEEP RAKE

George B. Hill and Frank D. Jones, Ottumwa, Iowa, assignors to Dain Manufacturing Company of Iowa, Ottumwa, Iowa, a corporation of Iowa Application May 29, 1939, Serial No. 276,318

23 Claims. (Cl. 56—27)

The present application relates to sweep rakes and has for its principal object the provision of a simplified and improved sweep rake adapted to be mounted on a tractor. This application is a continuation in part of our application, Serial No. 174,648, which was filed November 15, 1937.

Another object of this invention has to do with a novel rake head construction which is light in weight but is rigid and durable.

A further object relates to the provision of means for adjusting the rake head vertically relative to its supporting member without changing the position of the pivot point about which the rake is tilted relative to the plane of the rake teeth.

A further object relates to the provision of an improved lifting and locking mechanism, in which provision is made for optionally either locking the rake in ground engaging position, or preventing it from locking to obtain a floating action of the rake on the ground.

These and other objects will be made apparent by a consideration of the following description in which reference is made to the drawings appended hereto, in which Figure 1 is a perspective view of one embodiment of a tractor mounted rake constructed according to the principles of our invention;

Figure 2 is a plan view of the rake and tractor shown in Figure 1;

Figure 3 is a side elevation of the same;

Figure 7 is an enlarged detail side view of the rake adjusting lever and connecting links showing the parts in the position they assume when the rake is raised and with the links in over center lock relation to lock the rake up;

Figure 8 is a view similar to Figure 7 except that the lever and links are shown in the lowered position of the rake and with the links in over center relation in the opposite direction to lock the rake down; and Figure 9 is a similar view showing the parts in normal operating position with the links in unlocked relation to permit the rake head to float.

Figure 1:
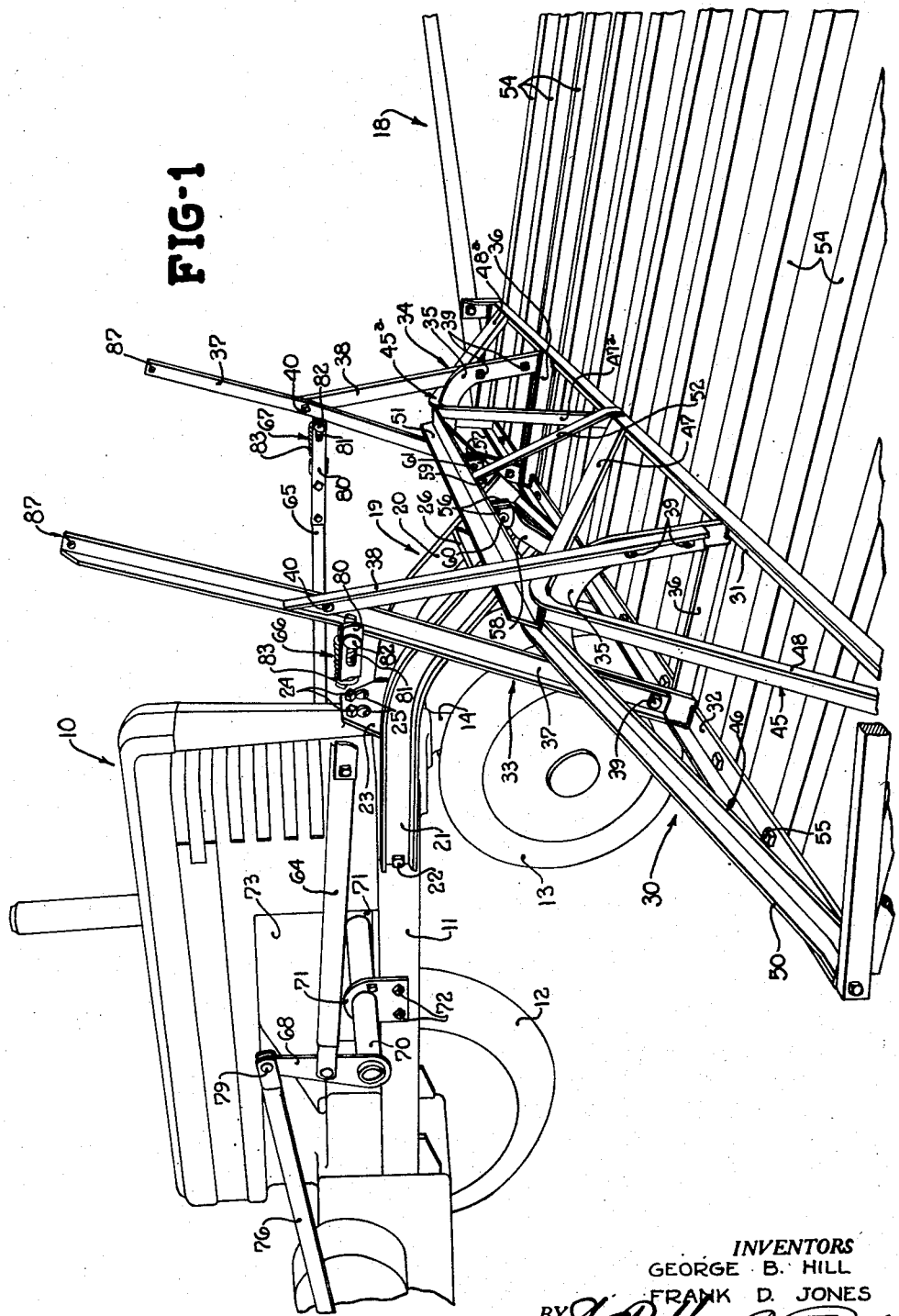

Referring now to the drawings and more particularly to Figures 1, 2, and 3, reference numeral 10 indicates a tractor of the tricycle type having a narrow, longitudinally extending supporting frame 11, carried on traction wheels 12 spaced widely at the rear of the tractor and journalled in laterally extending housings 15, and a pair of dirigible wheels 13 mounted closely together on a common steering and supporting post 14. The sweep rake, indicated generally by the reference numeral 18, is carried on a support 19 which is rigidly connected to the forward end of the tractor frame 11. The support 19 comprises a pair of longitudinally extending push bars 20, 21, spaced laterally to lie in juxtaposition along the side members of the frame 11 of the tractor and secured thereto by bolts 22. The two push bars 20, 21 are rigidly interconnected by means of a transverse plate member 23, the opposite lateral edges of which are secured, as by welding, to the inner faces of the push bars. The plate member 23 is positioned to lie against the front end of the tractor frame 11 and is attached rigidly to the tractor body by a pair of studs 24 projecting forwardly from the front surface of the tractor body, and threaded to receive suitable nuts.

The sweep rake support 19 is quickly and easily attachable to the tractor by virtue of a pair of key-hole shaped apertures 25, the lower portions of which are enlarged to fit over the nuts on the studs 24 and having upper narrowed portions which are of a width adapted to receive the studs 24 but against which the nuts can be tightened. Thus the support 19 can be quickly mounted on the tractor by sliding it in place from the front of the tractor with one of the bars on either side of the frame 11, slipping the apertures 25 and plate 23 over the nuts on the studs 24, and then lowering the bars until the plate 23 is supported on the studs 24 behind the nuts. The bolts 22 at the rear ends of the bars 20, 21 can then be inserted through apertures in the bars and suitable aligned openings in the side members of the frame 11. It is evident that after all bolts 22, 24 have been tightened, the supporting member 19 is rigidly mounted with respect to the tractor frame 11. The bars 20, 21 extend forwardly and are turned downwardly in parallelism, and are rigidly braced by a forward transverse interconnecting member 26.

The rake head, indicated generally by the reference numeral 30, comprises a pair of fore and aft spaced, transversely extending, parallel, tooth supporting members 31, 32. Spaced on either side of the fore and aft extending center line of the rake, are a pair of generally vertically extending frame structures 33, 34, mounted on the transverse members 31, 32. Each of the vertical frame structures comprises an arched bar member 35 bridging longitudinally from one of the transverse members to the other, and connected at opposite ends thereto, as by welding. The lower ends of the arched members 35 are braced by longitudinally extending horizontal braces 36. A pair of upwardly converging frame members 37, 38 are connected to the legs of the arched members 35, respectively, by suitable bolts 39 and are connected together near their upper ends by bolts 40.

Each of the vertically extending frame structures 33, 34, is rigidly braced by a pyramidal shaped bracing structure, comprising front and rear inverted V-shaped bracing members 45, 46 disposed in transversely extending upwardly converging planes. The V-shaped bracing members 45, 46 straddle the arched frame member 35 and are welded thereto at their apices, which are disposed closely adjacent to one another. One of the legs 47 of the forward bracing member 45 is fixed to the forward transverse supporting member 31 substantially at the midpoint of the latter at the longitudinal center line of the rake. The outer leg 48 of the bracing member 45 is fixed to the forward transverse supporting member 31 near its outer end thereof. Similarly, the inner leg 49 of the rear bracing member 46 is secured near the center of the rear transverse supporting member 32, while the outer bracing leg 50 of the member 46 is secured to the rear transverse supporting member 32 near the outer end thereof. The other vertical frame structure 34 is braced in a similar manner by a second pyramidal shaped bracing structure in which the various members are designated by the same reference numerals as the corresponding members in the bracing structure described above, but with the suffix "a". A transversely extending tie beam 51 extends between the two vertical frame structures 33, 34 above the transverse supporting members 31, 32, and is welded at opposite ends thereof to the apices of the pyramidal shaped bracing structures, respectively. The center of the tie beam 51 is braced by a pair of legs 52, 53, extending downwardly therefrom and connected at their lower ends to the midpoints of the transverse supporting members 31, 32, respectively. It will be apparent to those skilled in the art that a rake head constructed as described above and shown in the drawings, is inherently rigid and capable of withstanding severe shocks in any direction without appreciable distortion.

A plurality of forwardly extending rake teeth 54 are fastened by bolts 55 against the lower surfaces of the transverse supporting members 31, 32. The rake head is totally supported on the forward ends of the push bars 20, 21 for tilting movement about a transversely extending axis, by means of two pairs of lugs 56, 57 disposed on opposite sides of the center line of the rake, each pair of lugs being welded to the lower surface of the tie beam 51 and spaced apart sufficiently to receive supporting straps 58, 59, which are bent to embrace the forward ends of the push bars and are welded rigidly thereto. A pair of aligned pivot bolts 60, 61 extend through aligned apertures in each pair of lugs 56, 57, and their associated straps 58, 59, about which the rake can be tilted by means of a pair of rearwardly converging rods or links 64, 65, connected at their forward ends by flexible connections 66, 67 to the upwardly extending members 37 of the vertical frame structures 33, 34, respectively. The rear ends of the control rods 64, 65 are pivoted to arms 68, 69, which are fixed to a transversely extending rock shaft 70. The rock shaft is supported in bearing plates 71, rigidly secured by bolts 72 to opposite sides of the tractor frame 11. In the embodiment shown in Figures 1–3, the rock shaft 70 is disposed above the frame members 11 and extends through an opening 73 in the tractor body.

The rake head 30 is raised or lowered into transport or raking position by a hand lever 74, which is positioned near the operator's station on the tractor. The lever 74 is pivotally mounted at its bifurcated lower end on a bracket 77 which is disposed at one side of the tractor frame 11 and is attached to the front face of the rear axle housing 15. A lifting rod 76 is pivoted on a bolt 78 provided in the lever 74 and extends forwardly therefrom to a pivotal bolt connection 79 with one of the arms 68 on the transverse rock shaft 70.

Each of the flexible connections 66, 67 between the control rods 64, 65 and the vertical members 37 comprises a pair of strap members 80 bolted on opposite sides of each of the rods 64, 65, and having aligned slots 81 adapted to receive pins 82 fixed to the frame members 37, respectively. Compression springs 83 disposed between the straps 80, urge the rake head forwardly to maintain pressure of the forward ends of the teeth against the ground, but are adapted to yield when the ends of the teeth encounter a rising ground slope.

A push-off device 85 of more or less conventional design is swung from pivot bolts 86 inserted through apertures 87 in the upper ends of the frame members 37. The push-off device is actuated by a ground engaging stop arm 88 pivotally connected to the lower end of the swinging push-off device 85, said arm being adapted to dig into the ground when the implement is moved backwardly and thereby swing the push-off device 85 forwardly about the pivots 86 in a manner well known to those skilled in the art. The push-off device is removed in Figure 1 in order to more clearly show the details of construction of the rake head.

Figure 4:
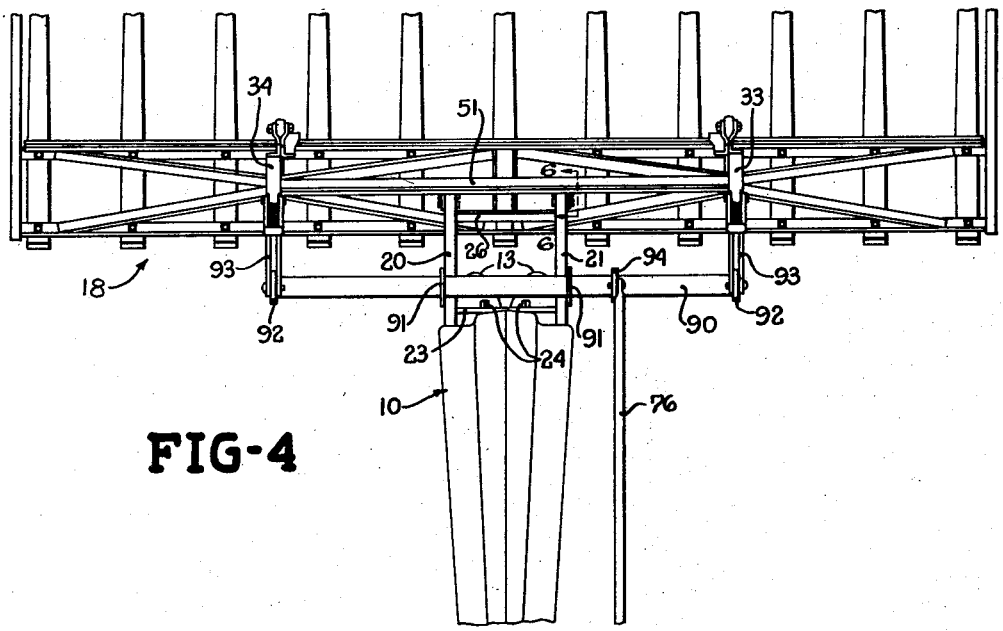
Figure 4 is a fragmentary plan view of a modification.
Figure 5:
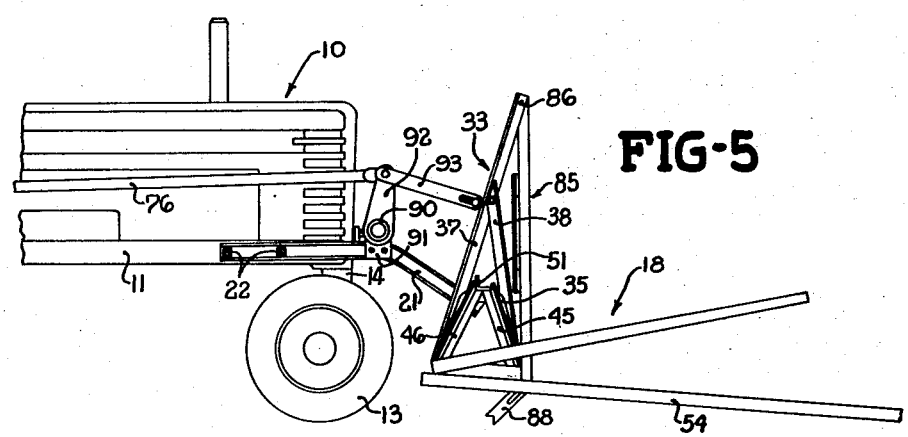
Figure 5 is a side elevation of the modification of Figure 4.
Figure 6:
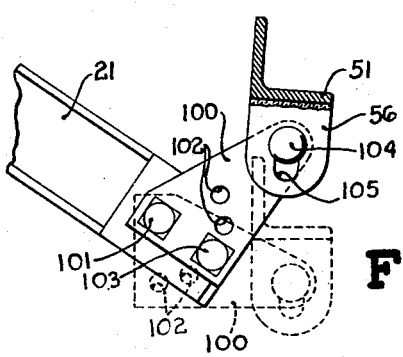
Figure 6 is an enlarged sectional elevation taken along the line 6—6 in Figure 4 showing the detail of the means for adjusting the rake vertically relative to the support.

Referring now more particularly to Figures 4, 5, and 6, the second embodiment of our invention includes a rake head identical to that shown in Figures 1, 2, and 3, and therefore the various parts are indicated in the drawings by the same reference numerals. In this embodiment, however, the rock shaft 90, instead of being mounted on the tractor frame 11, is carried upon the push bars 20, 21 in front of the tractor body 10, and is journaled in a pair of supporting plates 91 fixed on the outer sides of the push bars 20, 21, respectively. This location of the rock shaft has the advantage over that shown in Figure 1 in that it can be removed from the tractor together with the push bars and need not be handled separately. In this case the rock shaft extends laterally far enough so that the rock shaft arms 92 are directly rearward of the vertical frame structures 33, 34, and therefore the control links 93 are comparatively short and extend directly fore and aft instead of diverging forwardly from the rock shaft as in Figure 2. A third arm 94 is provided on the rock shaft to which the lifting rod 76 is connected.

It is frequently desirable to adjust the rake head vertically with respect to the supporting push bars 20, 21 so that the sweep rake may be used on different makes of tractors in which the frames are at slightly different distances above the ground and also to accommodate different sizes of front wheels 13 on the same make of tractor. In this connection there are some advantages in maintaining constant the distance between the axis about which the rake head tilts and the plane of the rake. As shown in Figure 6, the forward ends of the push bars are each provided with a plate 100, connected at one corner thereof by a bolt 101 to the push bar 21 and having a plurality of apertures 102, any one of which can be aligned with an aperture in the push bar 21 by swinging the plate about the bolt 101 as an axis. The plate can then be held in adjusted position by inserting a second bolt 103 through the aperture 102 and the aligned aperture in the bar 21. The outer end of the plate 100 carries a pivot bolt 104 extending through a suitable aperture in the plate and through slots 105 in the pair of ears or lugs 56 which are welded to the lower side of the tie bar 51. The purpose of the slot is to provide a limited amount of looseness in the pivot joint so that the rake head can yield upwardly if it should encounter an obstacle such as a stone. Except for this looseness provided by the slot, therefore, it is evident that the pivot 104 is maintained in a substantially constant distant distance above the plane of the rake teeth regardless of the adjustment of the height of the rake head by means of the shiftable plate 100. The highest setting of the rake head is shown in Figure 6 in solid lines, while in dotted lines is shown the parts in the lowest position of adjustment.

The rake head 30 may be locked in either a raking or transport position by means of an over center locking mechanism 110 connected with the hand lever 74. The mechanism 110 includes a locking lever 111 which is pivoted at its rear end on a bracket 112 by means of a pivot bolt 113 extending through aligned holes in the lever 111 and the bracket 112. The lever 111 extends forwardly from the pivot 113 and is connected near its front end by means of a pivot pin 114 to one end of a short link 115, the opposite end of the link being pivotally mounted on the pivot bolt 78, between legs 74a, 74b of the bifurcated lever 74. When the lever 74 is swung forwardly to lower the rake head 30 into raking position, the front end of the locking lever 111 is moved downwardly until the pivot 114 passes over center, that is, below a line drawn through the pivots 113 and 78, as shown in Figure 8. After the pivot 114 has passed below center far enough to lock the parts in this position, the lever 111 is secured against further downward movement by means of a finger 117 formed on the front end of the lever 111, which engages the bolt 78.

To raise the rake head 30 into transport position the lever 74 is swung rearwardly, the short link 115 moving in a clockwise direction to dispose the pivot 114 in an over center position forwardly of the pivot bolt 78. When the pivot 114 has been moved into this position (shown in Figure 7) it is held against continued movement in this direction by the lower edge of the lever 111 engaging the bolt 78.

When the rake is operated in fields which are unusually rolling or rough, causing rocking movement beyond the limits of the slots 81, the rake head 30 may be floatingly supported, so as to better adapt it to the inequalities of the ground. To accomplish this the mechanism is prevented from locking in the operating position of the rake by a cotter pin 118 or the like, which is inserted in a hole provided for this purpose in the forward end of the lever 111. The pin is so located as to engage the link 115 to prevent the pivot 114 from passing over center. This arrangement is shown in Figure 9.

A foot lever 119 is secured on the rear end of the lever 111 and extends rearwardly therefrom and is disposed within reach of the operator from his station on the tractor. By depressing the foot lever 119 the locking lever 111 is swung upwardly sufficient to raise the pivot 114, thereby breaking the over center lock, whereupon the hand lever 74 may be manipulated as described to change the rake head 30 from a raking to a transport position or vice versa.

We claim:

1. A rake head for a sweep rake comprising a pair of main transverse supporting members, a generally vertical frame structure disposed in a longitudinally extending plane and connected to said main members, respectively, and bracing members connected to said frame structure at points above said main members and extending to points of attachment with said main members at points spaced laterally from said frame structure.

2. In a sweep rake, a rake head comprising a pair of main transverse tooth supporting members, a pair of laterally spaced frame structures disposed in longitudinal-vertical planes and connected to said main members, and a pair of bracing structures associated with said frame structures, respectively, said bracing structures comprising a plurality of bracing legs connected to their associated frame structure at points above said main members and extending downwardly to points of attachment with each of said main members on opposite sides of said frame structures, respectively.

3. In a sweep rake, a rake head comprising a pair of main transverse tooth supporting members, a pair of laterally spaced, generally vertically extending frame structures mounted on said main members and spaced on opposite sides of the longitudinal center line of the rake, and a pyramidal shaped bracing structure associated with each of said frame structures, each of said bracing structures comprising a plurality of bracing legs fixed to said main members on opposite sides of the associated frame structure and converging upwardly to connection with the frame structure at the apex of said bracing structure, and a transverse tie beam extending between the apices of said pyramidal bracing structures.

4. In a sweep rake, a rake head comprising a pair of main transverse tooth supporting members, a pair of laterally spaced, generally vertically extending frame structures mounted on said main members and spaced on opposite sides of the longitudinal center line of the rake, and a pyramidal shaped bracing structure associated with each of said frame structures, each of said bracing structures comprising a plurality of bracing legs fixed to said main members on opposite sides of the associated frame structure and converging upwardly to connection with the frame structure at the apex of said bracing structure, a transverse tie beam extending between the apices of said pyramidal bracing structures, supporting means for said rake head pivotally connected to said transverse tie beam for swinging movement of the rake relative thereto about a transverse axis, and actuating means connected with said vertical frame structures for tilting said rake on said transverse pivot axis.

5. A tractor controlled sweep rake comprising a rake head including transverse tooth supporting members, a vertical extending frame structure mounted thereon having bracing members and a transverse tie beam disposed above said supporting members, a pair of longitudinally extending push bars adapted to be attached to a tractor, means for pivotally connecting said transverse tie beam to said push bars providing for tilting said rake head about a transverse axis, and actuating means connected to said frame structure and controlled by the tractor operator for tilting said rake.

6. A sweep rake adapted for use with a tractor having a generally longitudinal frame, said rake comprising a pair of push bars spaced laterally to lie in juxtaposition along opposite sides of the tractor frame, a transverse member interconnecting said bars, means for attaching said bars on opposite sides of the tractor frame, means for rigidly attaching said transverse member to the forward end of the tractor frame, a rake head, rake teeth supported thereon, means pivotally connecting said rake head at the forward ends of said push bars, and means controlled by the tractor operator for tilting said rake about said pivot connection.

7. A sweep rake adapted to be mounted on a tractor having a generally longitudinally extending frame including fore and aft extending side members and a front end, said rake comprising a rake support adapted to be rigidly mounted on the tractor, including a pair of fore and aft extending push bars rigidly interconnected by a transverse member, said bars being adapted to lie closely along opposite sides of the side members of the tractor frame, means for bolting said bars to said side frame members, and means for bolting said transverse member to the front end of said tractor frame, a rake head pivotally supported on the forward ends of said push bars for tilting movement about a transverse axis, rake teeth supported on said head, a rock shaft mounted transversely of said tractor, rods extending forwardly from said rock shaft and connected to said rake head, and means for rocking said rock shaft to tilt said rake head.

8. A tractor mounted sweep rake comprising a pair of push bars disposed fore and aft along opposite sides of a tractor body, means for attaching the rear ends of said bars to the tractor, means for supporting the forward ends of said push bars on the tractor, a rake head having pivotal connections with said push bars for supporting said rake entirely on said bars and providing for tilting movement relative thereto, each of said pivotal connections comprising a pair of hinged members, one of said hinged members being fixed to said rake head and means for attaching the other of said hinged members to the push bar in a plurality of vertically spaced positions, whereby said rake head can be adjusted vertically relative to the ground without changing the position of the pivot point relative to the rake head.

9. In a sweep rake, a rake head, rake teeth carried thereby, a supporting frame for said head, a plate pivoted to said frame by a horizontal bolt providing for swinging movement of said plate in a vertical plane, said plate having a plurality of perforations therein, bolt means insertable selectively through said holes for bolting said plate to said frame in several positions of vertical adjustment, and means pivotally connecting said rake head to said plate for tilting movement about a transverse axis.

10. In a sweep rake, a rake head comprising a pair of transversely extending tooth supporting members, a vertically disposed frame structure mounted on said members, and a pair of inverted V-shaped bracing members having apices attached to said frame structure and legs fixed to said transverse members.

11. In a sweep rake, a rake head comprising a pair of fore and aft spaced transverse tooth supporting members, a vertically disposed frame structure including a fore and aft extending member disposed above and interconnecting said transverse members, and a pair of inverted V-shaped bracing members having apices connected to said interconnecting member and having legs diverging downwardly therefrom to points of connection with said transverse members.

12. In a sweep rake, a rake head comprising a pair of transversely extending members, a vertically disposed frame structure mounted on said members, and a pair of inverted V-shaped bracing members disposed in transversely extending upwardly converging planes, said bracing members having apices disposed adjacent to one another and attached to said frame structure above said transverse members, and having legs diverging downwardly to points of connection with said transverse members.

13. In a sweep rake, a rake head comprising a pair of transversely extending members, a pair of vertically disposed frame structures mounted on said members and spaced laterally on opposite sides of the fore and aft center line of the rake head, and a bracing structure for each of said frame members comprising a pair of inverted V-shaped bracing members having apices attached to said frame structure and legs fixed to said transverse members.

14. In a sweep rake, a rake head comprising a pair of transversely extending members, a pair of vertically disposed frame structures mounted on said members and spaced laterally on opposite sides of the fore and aft center line of the rake head, a bracing structure for each of said frame members comprising a pair of inverted V-shaped bracing members having apices disposed adjacent to one another and attached to said frame structure above said transverse members, said bracing members having legs diverging downwardly to points of attachment with said transverse members, and a tie beam extending transversely between the apices of one pair of bracing members and the apices of the other pair of bracing members.

15. In an implement movable between operative and inoperative positions and having an actuating member connected thereto for moving the same, toggle linkage mechanism connected with said member for actuating the latter, said mechanism being movable into an over center position for locking said implement in one of said positions, and optionally removable detent means for limiting the extent of movement of said toggle linkage mechanism to prevent the latter from moving into said over center locked position.

16. In an implement movable between operative and inoperative positions and having an actuating member connected thereto for moving the same, linkage mechanism connected with said member for actuating the latter, said mechanism comprising a lifting lever pivotally connected to said actuating member and pivotally supported on the implement frame, a locking lever pivotally supported on the implement frame, a link interconnecting said lifting lever and said locking lever, said link being adapted to swing through an angle of more than 180 degrees between said operative and inoperative positions of the implement, into over center locked positions with respect to said locking lever at each end of the range of swinging movement, and an optionally removable detent member attached to said locking lever and engageable with said link just before said lever and link have moved into dead center relation at one end of the range of swinging movement.

17. In a sweep rake, a rake head comprising a pair of transversely extending members, a pair of vertically disposed frame structures mounted on said members and spaced laterally on opposite sides of the fore and aft center line of the rake head, a bracing structure for each of said frame members comprising a pair of inverted V-shaped bracing members having apices disposed adjacent to one another and attached to said frame structure above said transverse members, said bracing members having legs diverging downwardly to points of attachment with said transverse members, a tie beam extending transversely between the apices of one pair of bracing members and the apices of the other pair of bracing members, a pair of fore and aft extending push bars, means pivotally connecting said tie beam to said supporting frame at laterally spaced points on said beam, providing for tilting of said rake head about a transverse axis, a rock shaft supported on said push bars for rocking movement about a transverse axis, links interconnecting said rock shaft and said rake head, and means under control of the operator for rocking said rock shaft to tilt said rake head.

18. A rake head for a sweep rake comprising a pair of main transverse supporting members, a generally vertically disposed frame structure connected to said main members, and a generally pyramidal bracing structure comprising a plurality of bracing members fixed to said main transverse members at points spaced laterally from said frame structure and converging upwardly to closely adjacent points of connection with said vertical frame structure.

19. In a sweep rake, a rake head comprising a pair of main transverse tooth supporting members, a pair of laterally spaced, generally vertically extending frame structures mounted on said main members and spaced on opposite sides of the longitudinal center line of the rake, and a pyramidal shaped bracing structure associated with each of said frame structures, each of said bracing structures comprising a pair of bracing legs attached to said frame structure at adjacent points above the plane of said transverse members and diverging downwardly and connected to the transverse members, respectively, near said center line of the rake, and another pair of bracing legs connected to the frame structure and extending downwardly and laterally to points of connection near the outer ends of said main members, respectively.

20. A tractor controlled sweep rake comprising a rake head including transverse tooth supporting members, a vertically extending frame structure mounted thereon having bracing members and a transverse tie beam disposed above said supporting members, a pair of longitudinal extending push bars adapted to be attached to a tractor, means for pivotally connecting said transverse tie beam to said push bars providing for tilting said rake head about a transverse axis, a rock shaft journaled on an axis transverse to the tractor, actuating rods connected with said rock shaft, and means yieldably connecting said actuating rods with said rake head.

21. In a sweep rake, a rake head comprising a pair of transversely extending members, a pair of vertically disposed frame structures mounted on said members and spaced laterally on opposite sides of the fore and aft center line of the rake head, a bracing structure for each of said frame structures comprising a pair of inverted V-shaped bracing members having apices disposed adjacent to one another and attached to said frame structure above said transverse members, said bracing members having legs diverging downwardly to points of attachment with said transverse members, a tie beam extending transversely between the apices of one pair of bracing members and the apices of the other pair of bracing members, a supporting frame for said rake head, and means pivotally connecting said tie beam to said supporting frame at laterally spaced points on said beam, providing for tilting of said rake head about a transverse axis.

22. In a sweep rake, a rake head, rake teeth carried thereby, a support for said rake head, and means connecting said head to said support comprising a joint member pivoted to said head about a transverse axis, a pivot bolt connecting said joint member to said support providing for vertical swinging movement of said joint member, and means for fixing said joint member relative to said support in several different positions of vertical adjustment.

23. In a sweep rake, a rake head comprising a pair of longitudinal spaced, transversely extending tooth supporting members, a fore and aft extending vertical frame structure interconnecting said members, and a pair of inverted V-shaped bracing members having apices disposed adjacent to one another and attached to said frame structure above and between said transverse members, said bracing members having legs diverging downwardly to points of attachment with said transverse members.

GEORGE B. HILL.
FRANK D. JONES.